(12) United States Patent
Amoruso

(10) Patent No.: US 6,504,646 B1
(45) Date of Patent: *Jan. 7, 2003

(54) OPTICAL COMMUNICATION SYSTEM AND COMPONENT CONTROL ARCHITECTURES AND METHODS

(75) Inventor: Victor P. Amoruso, Baltimore, MD (US)

(73) Assignee: Corvis Corporation, Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/025,298

(22) Filed: Dec. 19, 2001

Related U.S. Application Data

(63) Continuation of application No. 09/441,806, filed on Nov. 17, 1999, now Pat. No. 6,359,729.
(60) Provisional application No. 60/108,753, filed on Nov. 17, 1998.

(51) Int. Cl.[7] .................................................. H01S 3/00
(52) U.S. Cl. ..................................... 359/341.1; 359/177
(58) Field of Search .............................. 359/142, 341.1, 359/177, 154, 109

(56) References Cited

U.S. PATENT DOCUMENTS

| 5,113,459 | A | | 5/1992 | Grasso et al. |
| 5,532,864 | A | | 7/1996 | Alexander et al. |
| 5,870,213 | A | | 2/1999 | Ishikawa et al. |
| 5,905,715 | A | | 5/1999 | Azarmi et al. |
| 5,914,794 | A | * | 6/1999 | Fee et al. .................... 359/110 |
| 5,978,115 | A | * | 11/1999 | Condict et al. ............. 359/124 |
| 6,163,392 | A | * | 12/2000 | Condict et al. ............. 359/124 |
| 6,359,729 | B1 | * | 3/2002 | Amoruso ................. 359/341.1 |

FOREIGN PATENT DOCUMENTS

| WO | WO 98/53571 | 11/1998 |
| WO | WO 98/54863 | 12/1998 |
| WO | WO 99/53714 | 10/1999 |

OTHER PUBLICATIONS

Gustafsson, P., "Telecom Network Management", Oct. 19, 1999, CEI–Europe, Barcelona (Spain) XP002175855, p. 8.

* cited by examiner

Primary Examiner—Mark Hellner

(57) ABSTRACT

Systems, apparatuses, and methods are disclosed that include network control architectures that provide for distributed control of the optical component work functions and network management. The distribution of the work function control in the network element provides for a hierarchical division of work function responsibilities. The hierarchical division provides for streamlined and specically tailored control structures that greatly increases the reliability of the network management system.

20 Claims, 5 Drawing Sheets

OPTICAL COMMUNICATION SYSTEM AND COMPONENT CONTROL ARCHITECTURES AND METHODS

CROSS-REFERENCE TO RELATED APPLICATIONS

This application is a continuation of application Ser. No. 09/441,806, filed Nov. 17, 1999, now U.S. Pat. No. 6,359,729, which is a continuation in part of commonly assigned U.S. Provisional Patent Application Serial No. 60/108,753 filed Nov. 17, 1998, which is incorporated herein by reference.

STATEMENT REGARDING FEDERALLY SPONSORED RESEARCH OR DEVELOPMENT

Not Applicable

BACKGROUND OF THE INVENTION

The present invention is directed generally to optical communication systems. More particularly, the invention relates to the control and operation of optical systems and optical components, such as amplifiers, transmitters, receivers, switches, add/drop multiplexers, filters, etc., and the optical links and networks comprising the systems.

Fiber optic transmission systems generally involve numerous optical links that are arranged in point to point, ring, mesh, or other configurations which are interconnected to provide communication services over a geographic region. Each of the various links must be managed and operated to ensure the proper flow of communications traffic within the link. The interconnection of the various links requires additional management oversight and control to ensure the smooth flow communications traffic between the various transmission links in the system.

As used herein, communications traffic should be interpreted in its broadest sense to include audio, video, data, and other forms of information that can be optically transferred. Likewise, the term "system" should be broadly construed to include a single linear link consisting of an optical transmitter and an optical receiver, as well as optical networks including pluralities of diversely located transmitters and receivers that are interconnected by one or more optical fibers and various optical components, such as optical switches, amplifiers, add/drop devices, filters, equalizers, etc.

The necessity of simultaneously managing the individual transmission links and a network of links has led to the development of standardized hierarchical approaches to optical network management. One such standardized structure, known as the Telecommunication Management Network ("TMN") structure, allocates the management responsibilities over number of management levels, as generally shown in FIG. 1.

In the TMN structure, a Network Management Layer ("NML") performs monitoring and control functions on a network basis. High level network tasks, such as establishing network connectivity including establishing primary and protection paths and wavelength management functions are performed through the NML. A Service Management Layer ("SML") is provided for communications service providers to interface with one or more NML reporting to the service layer. The SML is used to provision the network as required to meet communication traffic patterns in the system and report to service configuration to a Business Management Layer ("BML") of the service provider.

The TMN structure separates the network management functions into two layers to provide a hierarchical division of the management functions. The NML receives high-level network configuration instructions from the SML and develops a general set of element instructions necessary to implement the network instructions. The NML sends the general element instructions to an Element Management Layer ("EML"), in which a plurality of element managers are typically used to oversee a Network Element Layer ("NEL"). The NEL includes the optical components and associated hardware that comprise the actual transmission system and which are generally referred to as network elements ("NE"). Each network element, or optical component, generally includes a network element, or optical component, controller that controls the operation of the component in accordance with the specific element instructions from the element manager.

Communication between the various TMN layers is generally follows established protocols, such as SNMP (Signaling Network Management Protocol), CMIP (Common Management Information Protocol), CORBA (Common Object Request Broker Architecture), Java, Q3, etc. The network and element managers and the component controllers generally are configured according to protocols, such as GDMO (Guideline for Definition of Managed Objects) and its derivatives, as well as other standard protocols. Whereas, the component controller typically control the sub-components using proprietary protocols particular to the optical system.

In the operation of the optical system, element managers are generally assigned to one or more network elements that will usually, but not necessarily, be interconnected in one or more specific links, or segments, in the network. The network manager sends the general element instructions to the element managers. Each element manager generates specific element instructions for its managed network elements from the general element instructions. The specific network element instructions can be distributed directly to optical components either, for example via a local, metropolitan, or wide area network (LAN, MAN, or WAN, respectively). Alternatively, specific network element instructions can be distributed remotely via a supervisory or service channel that provides communication between the network elements in the NEL.

The component controller not only receives and process the specific element instructions, but controls all work functions performed in the component including those performed by component peripherals, or sub-components, such as pumps, heaters, coolers, current sources, etc. The component controller also monitors the sub-component performance and provides status information to the element manager for higher level and/or redundant analysis and monitoring.

In many systems, the operation of the sub-components in the optical component are controlled by the component controllers and performed with reference to one or more Management Information Bases (MIBs). The MIBs provide operational parameters for each controllable portion of the component as a function of monitored operating characteristics of the optical components. The component controller monitors the operating characteristics and controls the operation of the component and its sub-components in accordance with its associated MIBs.

The element managers monitor the performance of the network elements/optical components for compliance with the general element instructions and generate element status reports on the network element status. The network manager monitors the element status reports from the element managers to ensure compliance with the network instructions and provides a network report with respect to the network instructions to the service manager.

A shortcoming with conventional TMN based systems is that control of the actual operation of the optical system has been pushed down through the management hierarchy to the network element level. Thus, the TMN structure involves a plurality of management layers that provide oversight responsibilities, but the component controllers are solely responsible for control of multiple tasks that must be coordinated and monitored to ensure correct operation of the component. As such, the component controller represents a single point of failure that could disable the component, as well as a link and possibly larger segments of the network.

The traditional view toward addressing the risk of a component controller failure has been to provide controllers having increased processing power and reliability or redundant controllers. However, the use of higher performance component controllers does not ameliorate the consequences of a component controller failure, but merely reduces the risk of component failure. High performance controllers also tend to increase the local heat generation of the component, which increases the cooling requirements of the system. Whereas, redundant controllers provide additional protection against a controller failure, but further increases the complexity of the control structure, thereby increasing the probability of a controller malfunction. In view of the substantial problems that can result from component controller failures and malfunctions, it would be desirable to have a network management structure that reduces the risks associated with component controller failures to provide robust optical systems.

BRIEF SUMMARY OF THE INVENTION

The present invention addresses the need for higher reliability optical transmission systems, apparatuses, and methods. Optical systems of the present invention include a network control architecture that provides for distributed control of the optical component work functions and network management. The distribution of the work function control in the network element provides for a hierarchical division of work function responsibilities. The hierarchical division provides for streamlined and specically tailored control structures that greatly increases the reliability of the network management system.

In various embodiments, dedicated work function controllers are provided for each work function performed in the optical component. For example, work function controllers can be used to control the performance of one or more laser diodes used in the system. In addition, the work function can be further distributed, when particular work function are performed multiple times in the network element. Continuing the example, a work function controller can be provided for each laser diode to allow for individual control over that diode. An overall laser diode work function controller can be used to oversee the individual laser diode controllers and report the overall laser diode status to the component controller.

In addition, communication bypass can be provided to allow the element managers to communicate directly with work function controllers in the event of a component controller failure. The bypass can be established by providing a redundant component controller that serves during normal operation solely as a work function controller, but in fault condition can dully operate as a component controller and work function controller. Alternatively, a bypass can be provided to allow direct communication between the element managers and the work function controller. Similarly, in multiple layered work function architectures, communication bypass can be provided the optical component controllers and the lower level work function controllers.

Thus, necessary for higher performance optical systems. These advantages and others will become apparent from the following detailed description.

BRIEF DESCRIPTION OF THE DRAWINGS

Embodiments of the present invention will now be described, by way of example only, with reference to the accompanying drawings for the purpose of illustrating embodiments only and not for purposes of limiting the same; wherein like members bear like reference numerals and:

FIGS. 3–5 show optical system embodiments.

DESCRIPTION OF THE INVENTION

An optical system 10 of the present invention is provisioned such that the actual operation and control network element/optical components 12 in the system 10 is distributed among autonomous work function controllers $14_i$ in the component 12. The autonomous work function controllers $14_i$ provide dedicated control over one or more assigned work functions being performed in the optical component 12. Whereas, component: controllers 16 are used to monitor, control the work function controllers $14_i$ in the component 12, and possibly provide direct work function control if a work function controller malfunctions.

Figure 1:
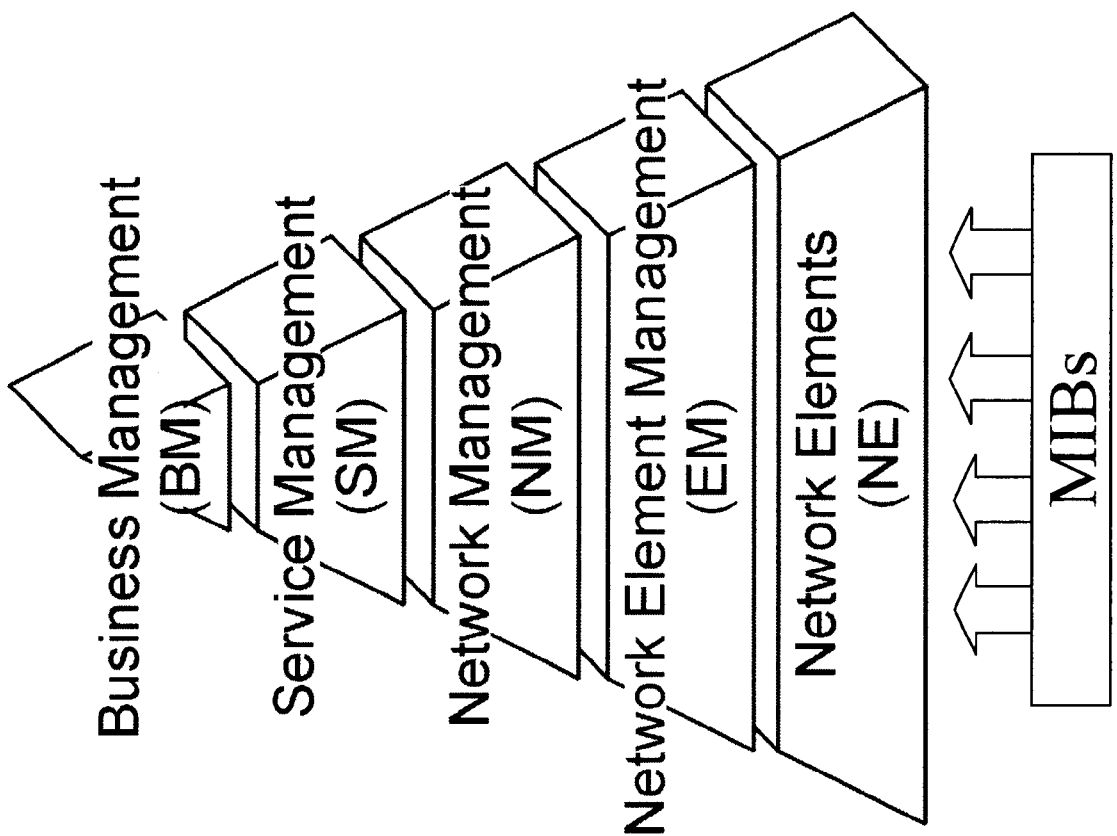
FIG. 1 show the standard Telecommunications Management Network hierarchical structure.
Figure 2:
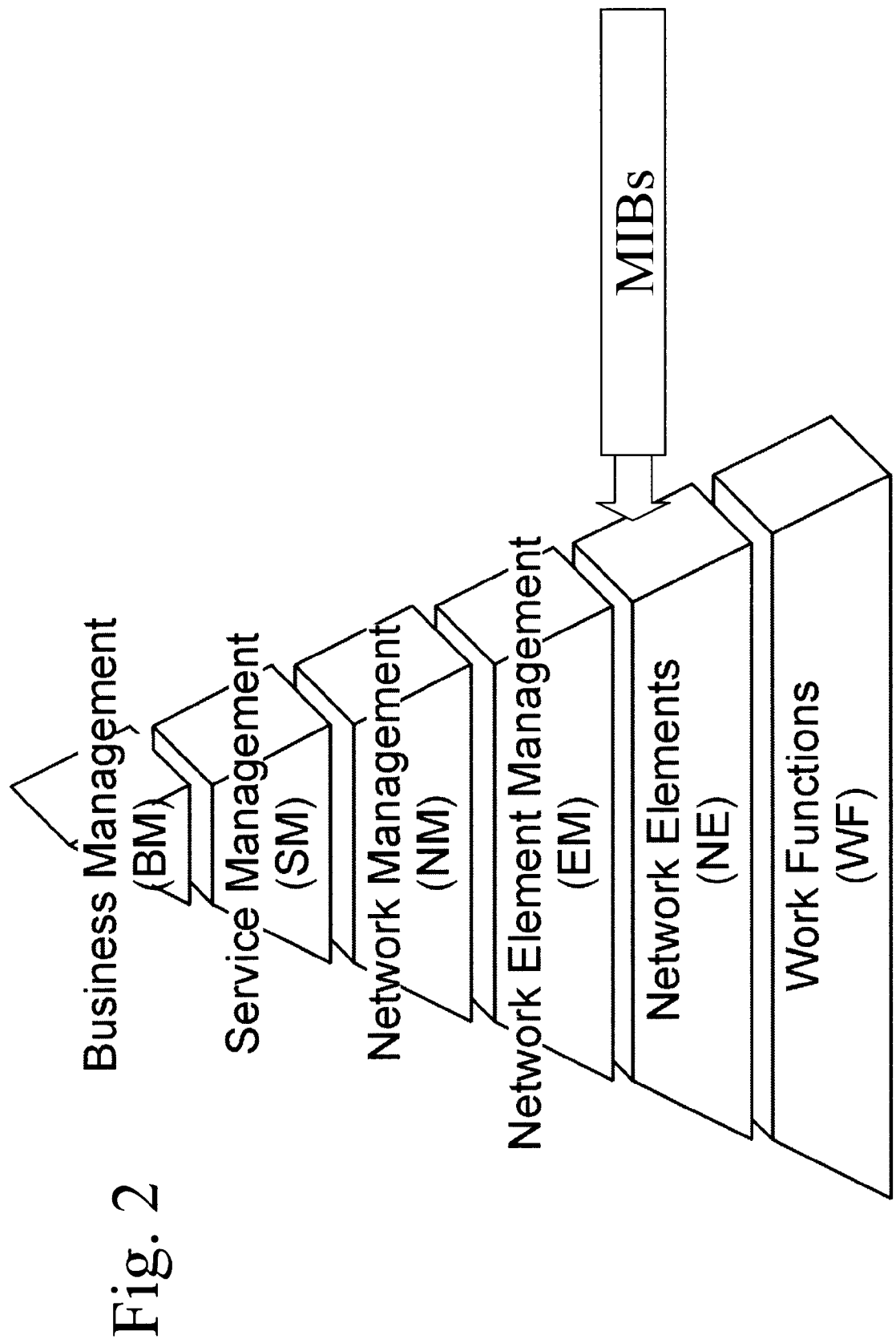
FIG. 2 show the Telecommunications Management Network hierarchical structure of the present invention.

The hierarchical division of optical component control functions between the component controllers 16 and the work function controllers $14_i$ provides for distributed architecture for implementing and control work functions in the system 10. The distributed work function architecture can be considered a new layer in the TMN structure as shown in FIG. 2, as the Work Function Layer.

The distribution of component operation responsibilities tends to lessen the impact on the system, if one or more work function controllers 14 or the component controller 16 were to fail. In addition, the distribution of processing function between multiple layers in the optical component increase the system performance by focusing both the component controller and the work function controller resources on a small number of tasks. The distribution of the processing in the component also increases the thermal performance of the system by distributing the heat load that must be dissipated during operation.

The work function controller 14 also provides the capability to reconfigure work function performance characteristics and provide multiple control level oversight of the work functions. The reconfigurable work function allows the operation of the optical component 12 to be changed as the network requirements are updated or the system 10 is reconfigured. The distribution of the processing responsibilities also facilitate less complicated updates because of the limited responsibilities of each controller. This, in turn, also tends to lessen the consequences of programming errors in the controllers 14 and 16.

In the present invention, the component controller 16 is configured to receive element instructions from an element manager EM and provide work function instructions to one or more work function controllers $14_i$. The work function controllers $14_i$ control and monitor the work functions pursuant to work function instructions either provided by the component controller 16. In the absence of specific instructions from the component controller 16, the work function controllers $14_i$ can operate using default instructions in accordance with its associated MIBs, which can reside in local memory on work function controller $14_i$.

The work function controller $14_i$ will generally control the operation of one or more component peripherals, or subcomponents, such as optical and electrical sources, filters, switches, etc. The work function controller $14_i$ can serve as temperature controllers, voltage and current controllers, and mechanical controllers for use with the sub-components.

In an optical link, only certain optical components 12 are directly connected to the element manager EM, which are referred to herein as optical component nodes 12N. The other optical components communicate with the element manager EM via the optical nodes 12 and are referred to remote optical compenents 12R.

The use of optical nodes 12N decreases the number of optical components 12 that must interface with an element manager and can provide additional oversight control over remotely connected optical components 12R. The component controllers 16 in the optical nodes 12N can be configured to pass system information between the element manager and the remote components 12R within the system 10. The component controllers 16 in the optical nodes 12N can also be configured to implement network protection schemes in the system 10.

Figure 3:
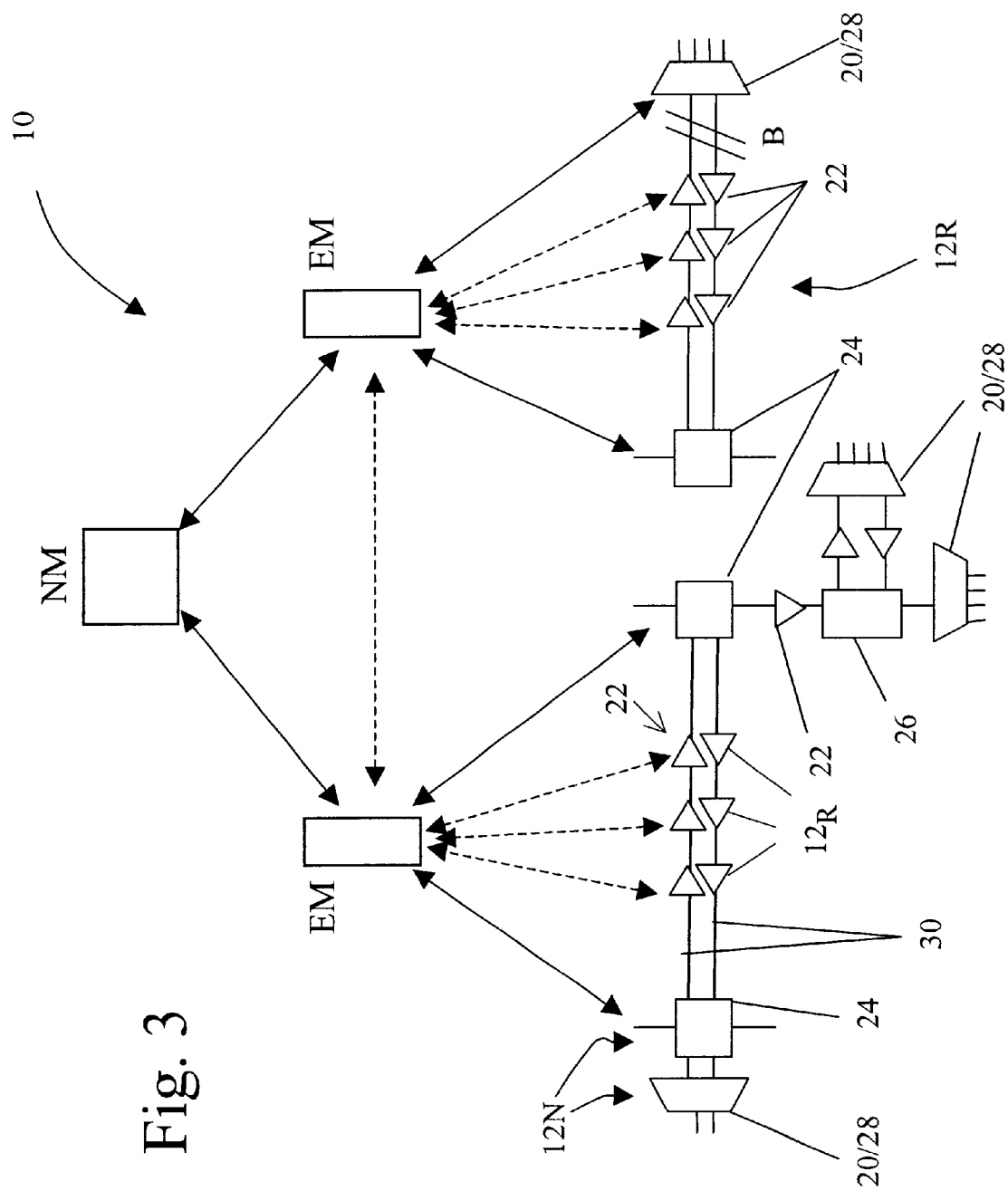
FIG. 3 show a network management system structure.

FIG. 3 shows an embodiment of the optical system 10, in which the element manager EM interfaces, either directly or remotely, with the one or more network elements/optical components 12. The optical components 12 may include one or more transmitters 20, optical amplifiers 22, optical switches 24, optical add/drop multiplexers 26, and receivers 28 in optical systems 10. The optical components 12 can be deployed in various configurations, such as described in commonly assigned, U.S. patent application filed herewith as Ser. No. 90/441,805 entitled "Wavelength Division Multiplexed Optical Transmission Systems, Apparatuses, and Methods", the disclosure of which is incorporated herein by reference.

As described in the incorporated reference, element instructions and other system information can be transmitted through the optical system 10 using either a dedicated service channel or a mixed data channel carrying both communications traffic and system information. For example, communication between the element managers EM and the remote optical components 12R can be provided through an optical mixed data channel Λomd via the optical component nodes 12N. The mixed data channel Λmd also provides for component to component communication with the network element layer and other service provider communications, such as order wires, etc.

Figure 4:
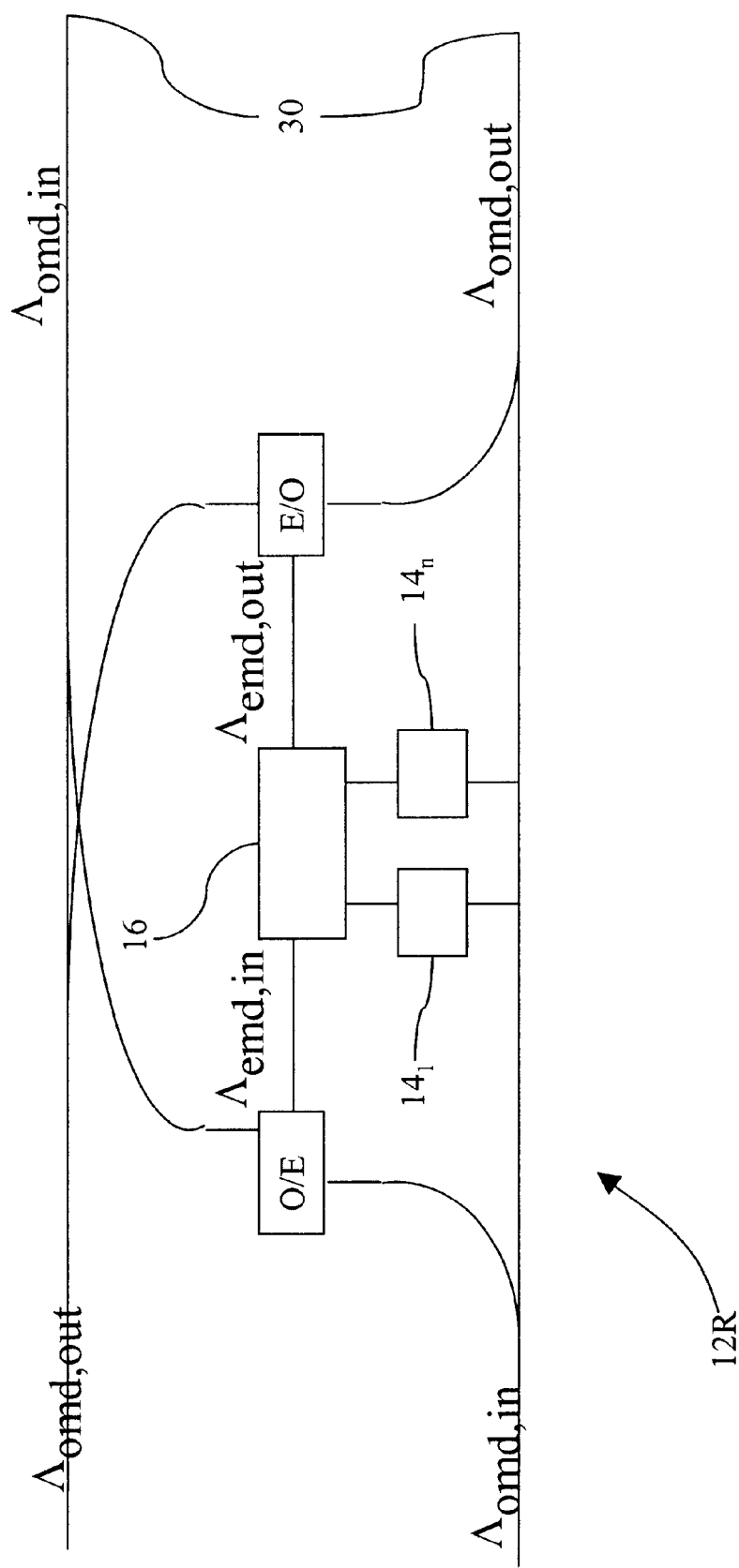
Figure 5:
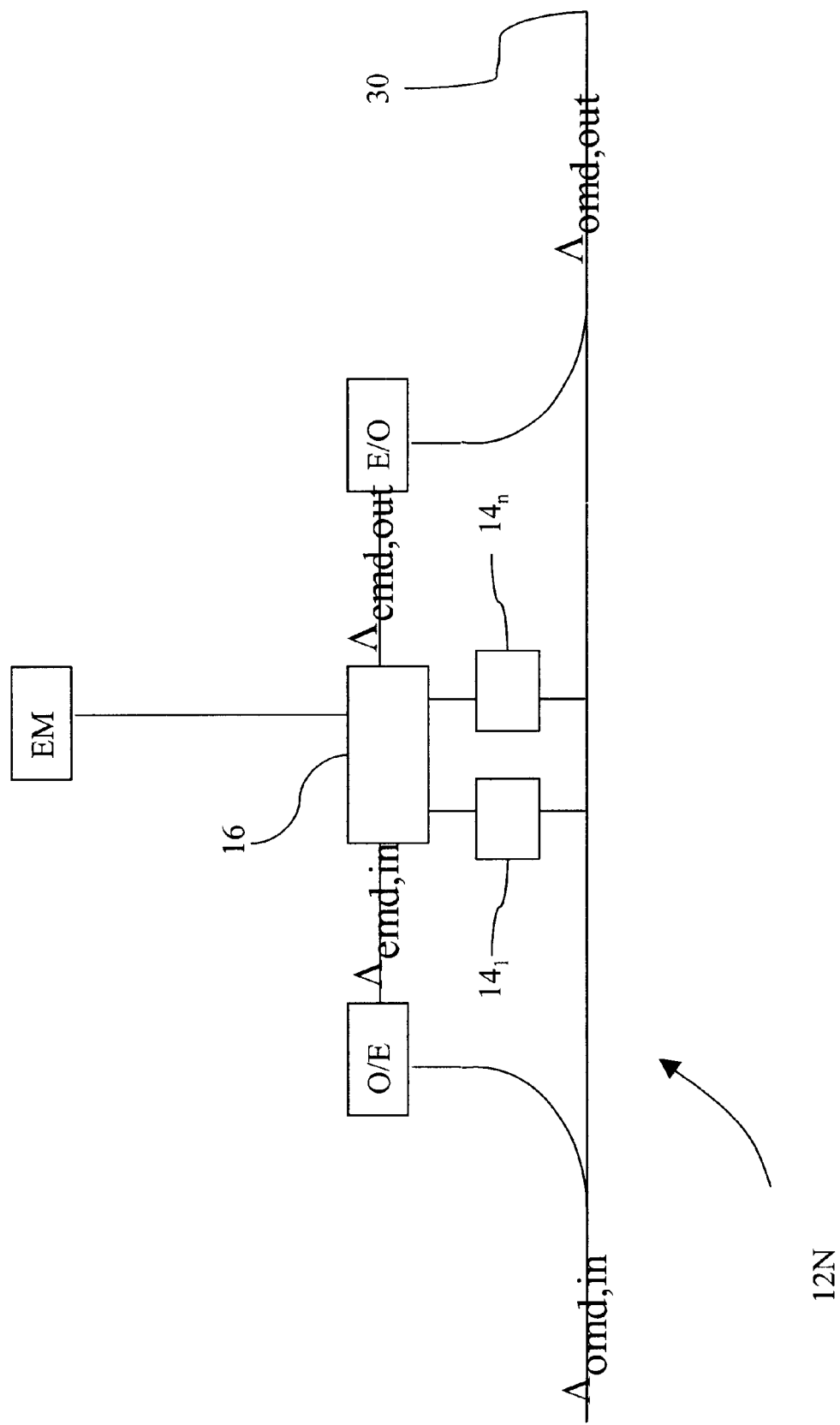

As shown in FIG. 4, remote optical components 12R generally include an optical/electrical converter O/E to receive an optical mixed data channel Λomd,IN via an optical fiber 30. The optical mixed data channel Λomd,IN is converted to an electrical mixed data channel Λemd,IN and system supervisory information pertinent to the remote component 12R, i.e., element instructions, is provided to the component controller 16. The controller 16 upon receipt of the element instructions provides corresponding work function instructions to the work function controller $14_i$. The work function controllers will generally perform a work function affecting the communications traffic passing through the optical fiber 30.

The work function controllers $14_i$ in the optical component 12 monitor the work function and provide status reports. The component controller 16 monitors the status of the work function controllers $14_i$ for compliance with the work function instructions. The component controller 16 also generates a component status report that is multiplexed with the communication traffic and other information carried by the mixed data channel to provide an electrical mixed data channel output signal Λemd,OUT. An electrical to optical converter E/O, e.g. transmitter, converts the electrical mixed data channel output signal Λemd,OUT to an optical signal Λomd,OUT that is transmitted via the optical fiber 30 to the next optical components 12.

Likewise, in FIG. 4, optical nodes 12N can send and receive system information via the mixed data channel, and additionally, will directly interface with the element manager EM. The optical nodes 12N report their own component status, as well as the component status of the remote optical components 12R and other optical nodes 12N received via the mixed data channel.

Upon receiving element instructions from the element manager EM, the component controller 16 at the optical nodes 12N will forward the element instructions to remote optical components 12R through the mixed data channel. The optical node component controller 16 will also generate and send work function instructions to the work function controllers associated with the optical node 12N. The element manager EM can also be configured to send element instructions to a first optical node $12N_1$ through at least a second optical node $12N_2$. The element instruction will then be forwarded through the mixed data channel to the first optical node $12N_1$ to provide one or more redundant links between the element manager EM and the optical nodes.

While the above implementation was described with respect to a mixed data channel, a dedicated service channel can also be provided. In addition, the element instructions and other system information can be counter-propagated and/or co-propagated along with the communications traffic and transmitted over one or more fibers depending upon the transmission system.

If two fibers are available in a transmission path, such as shown in FIG. 3, then system information can be propagated in both directions and redundant system information will reach the element manager EM during normal operation. The element manager EM can be configured to correlate the redundant information to identify discrepancies as will be discuss further herein.

In the present invention, the component controllers 16 can be any microprocessor suitable for performing the monitoring and control functions for the component. For example, a Motorola 860 microprocessor or other microprocessor of comparable or greater capabilities can be used as component controllers 16. The duties of work function controllers $14_i$ can generally be performed using a microcontroller, such as the Atmel AVR Mega 103 or other microcontrollers or microprocessors of comparable or greater capabilities.

Many optical components have a number of work functions being performed, such as in an optical switch or add/drop multiplexer, or are often collocated at a site, such as a rack of transmitters and/or receivers. In these components or configurations, it may desirable to use more than one component controller 16. To facilitate communication with the element manager EM, one component controller 16 can be designated to act as a primary/master central processor that is used to interface with element managers. The remaining central processors serve as secondary/slave processors that interface with the primary central processor analogous to the communication between the component controller and the work function controllers.

Communication between the primary central processor and the secondary component controllers 16 and the work function controllers 14$_i$ can be provided using standard communications protocols, such as Ethernet, ATM, RS-485 multidrop, or HDLC multimaster, or proprietary protocols as may be appropriate. In addition, one or more secondary controllers can be configured to serve as the primary controller in the event of a primary central processor failure. Redundant component controllers and work function controllers also can be used to further militate against catastrophic controller failures.

Illustratively, the work function controllers 14$_i$ for use in optical components may control and oversee work functions including the operation and control of: pump and signal laser power, wavelength stabilization, optical signal detection, pump laser temperature stabilization, Bragg grating and other filter stabilization, on/off gate switching, E/O and O/E signal conversion, and detector wavelength stabilization. The precise work functions performed by each optical component will vary depending upon the responsibilities of each component. For example, laser signal power control, wavelength and temperature stabilization may be performed in transmitters for signal lasers and amplifiers for pump lasers. Likewise, Bragg grating stabilization can be performed in receivers, switches, add/drop devices, as well as in amplifiers or transmitters.

The present invention can be further described by way of example. If a fiber is cut in a transmission link, for example, at point 3 in FIG. 3, an optical signal sent by the transmitter 20 will not reach the optical amplifier 22. A signal detection work function controller can be provided to sense the presence/absence of signal being sent by the transmitter 20. It no optical signal is detected, the signal detection work function controller 14 can initiate an amplifier shutdown procedure, such as laser pump shutdown, and report the loss of signal to the amplifier component controller 16.

The component controller 16, in turn, can correlate the work function status provided by the signal detection work function controller with status reports from other work function controllers. Upon correlation of the status reports, the component controller 16 can instruct the signal detection controller whether or not to continue shutdown procedures. In this instance, the component controller provides local processing and control that could prevent an unnecessary shut down of the amplifier pump laser in the case of signal detector failure.

Continuing, the amplifier component controller 16 can then report the component status via the mixed data channel in both directions to the optical component nodes 12N, including the transmitter 20 and the optical switch 24, respectively. Component status reports will indicate a possible fiber cut between the transmitter 20 and the amplifier 22. If the element manager receives the amplifier component status report only from the optical switch 24, the element manager EM will have corroborating evidence that a fiber cut exists as provided in the amplifier component status report. The element manager EM will then send a network status report to the network manager NM indicating the fiber cut and the network manager will take appropriate action to reroute communications traffic passing through the link.

In this example, providing service channel information from both directions allows for the remote shut down of lasers, as well as other actions that may be necessary in the event of a fiber cut. As previously discussed, the transmitter and optical switch status reports from the transmitter optical node can also be sent via service channel to the other optical nodes. The absence of a duplicate status report from the transmitter and the optical switch would provide a further indication of a fiber cut.

It is often desirable to configure work function controllers 14$_i$ to operate in accordance with default values and/or the last work instructions provided by component controller 16. In those configurations, the work function controllers 14$_i$ will continue to operate in a controlled manner according to the last received work instructions or default instructions in the event of component controller 16 failure. The ability to continue operation upon the failure of a component controller 16 or work function controller 14$_i$ is particularly useful in optical amplifier components, which are often remotely located.

For example, if an optical amplifier controller 16 fails, the work function controllers 14$_i$ will continue to operate pump diodes and other sub-components. While the system performance may not degrade, the lack of component status report from the amplifier controller 16 to the element manager EM will indicate that the amplifier controller 16 has failed. Corroborating evidence of the amplifier controller failure will be provided if other components along the link do not indicate a problem.

Conversely, if a work function controller fails, the lack of status report will indicate a possible work function controller failure to the amplifier controller. If the amplifier controller determines that a failure has occurred, the amplifier controller can modify the work function instructions of any other work function controllers under its control to mitigate the effect of the failure. For example, a redundant pump could be activated in the case of a pump failure, or other work functions can be adjusted in accordance with the work function MIB to compensate for the failure. The amplifier controller will provide a component status report to the element manager EM indicating the work function controller failure. It may also be possible for the component controller to bypass the failed work function controller and provide work function control of the work function.

Those of ordinary skill in the art will appreciate that numerous modifications and variations that can be made to specific aspects of the present invention without departing from the scope of the present invention.

What is claimed is:

1. An optical communication system comprising:
   an element manager;
   a plurality of optical components including at least one transmitter configured to optically transmit information to at least one receiver wherein at least one optical component includes:
      a work function controller configured to autonomously control a work function of the optical component in accordance with work function instructions; and,
      a component controller configured to receive element instructions from the element manager and to send corresponding work function instructions to the work function controller; and
   a communication channel connecting at least two of the plurality of optical components.

2. The system of claim 1 wherein the communication channel is a mixed data channel carrying data and work function instructions.

3. The system of claim 2 wherein the at least one optical component further includes:
  an optical-to-electrical converter connected between the communication channel and the work function controller; and
  an electrical-to-optical converter connected between the communication channel and the work function controller.

4. The system of claim 3 wherein optical-to-electrical converter converts an optical data signal from the mixed data channel into an electrical data signal including the work function instructions, and sending the work function instructions to the component controller.

5. The system of claim 3 wherein the electrical-to-optical converter converts data and work function instructions from the component controller into an optical data signal that is transmitted on the mixed data channel.

6. The system of claim 1 wherein the communication channel only carries work function instructions.

7. The system of claim 1, wherein:
  at least one of the optical components is an optical amplifier;
  the work function controller controls the pump laser power and wavelength supplied to the optical amplifier and provides work function status reports including the current pump laser power and temperature; and,
  the component controller provides work function instructions including pump laser power and temperature set points.

8. The system of claim 1, wherein:
  at least one of the optical components is a temperature controlled fiber Bragg grating;
  the work function controller controls a heater/cooler configured to heat/cool the grating and provides work function status reports including the temperature of the grating; and,
  the component controller provides work function instructions including the grating temperature.

9. The system of claim 8, wherein the component controller provides work function instructions further including the temperature response of the heater/cooler.

10. The system of claim 8, wherein the work function controller contains the temperature response of the heater/cooler in local memory.

11. The system of claim 1, wherein:
  at least one of the optical components is an optical switch;
  the work function controller controls a switch gate in an off/on position and provides work function status reports including the position of the gate; and,
  the component controller provides work function instructions including the position of the switch gate.

12. The system of claim 11, wherein:
  the component controller provides work function instructions including a power requirement to set the position of the switch gate; and,
  the work function controller is further configured to control the power provided to the switch gate and provide work function status reports including power supplied to the switch gate.

13. A method of controlling an optical communication system having a plurality of optical components including at least one transmitter configured to optically transmit information to at least one receiver based upon network management instructions comprising:
  generating element instructions for the optical component based on the network management instructions;
  communicating the element instructions to a component controller in the optical components;
  generating work function instructions based on the element instructions;
  communicating the work function instructions to work function controllers in the optical component; and
  controlling work functions in the optical component in accordance with work function instructions.

14. The method of claim 13, further comprising detecting a component controller failure.

15. The method of claim 14, further comprising generating work function instructions based upon the network management instructions when a component controller failure is detected.

16. The method of claim 15, further comprising generating work function instructions based upon default instructions from a management information base.

17. The method of claim 14, further comprising generating work function instructions based upon default instructions from a management information base when a component controller failure is detected.

18. The method of claim 13 wherein the element instructions are communicated in combination with data.

19. The method of claim 18, further comprising receiving the element instructions and data and separating the element instructions from the data.

20. The method of claim 18, further comprising transmitting element instructions and data from one component controller to another component controller.

* * * * *